(12) United States Patent
Cosentino

(10) Patent No.: US 6,560,885 B1
(45) Date of Patent: May 13, 2003

(54) MULTI-CONFIGURABLE MODULAR LEVEL

(76) Inventor: Bruno A. Cosentino, 38 New St., Eastchester, NY (US) 10709

( * ) Notice: Subject to any disclaimer, the term of this patent is extended or adjusted under 35 U.S.C. 154(b) by 0 days.

(21) Appl. No.: 09/943,970

(22) Filed: Aug. 31, 2001

Related U.S. Application Data

(63) Continuation of application No. 09/375,863, filed on Aug. 17, 1999, now Pat. No. 6,282,805.

(51) Int. Cl.[7] ................................................. G01C 9/26
(52) U.S. Cl. ..................................................... 33/374
(58) Field of Search ........................... 33/374, 375, 379, 33/382, 383, 809

(56) References Cited

U.S. PATENT DOCUMENTS

| | | | | | |
|---|---|---|---|---|---|
| 970,729 | A | * | 9/1910 | Lingle | 33/383 |
| 1,462,430 | A | * | 7/1923 | Vogel | 33/383 |
| 2,551,524 | A | * | 5/1951 | Bullivant | 33/374 |
| 2,562,127 | A | * | 7/1951 | Sand | 33/383 |
| 2,692,440 | A | * | 10/1954 | Walters | 33/383 |
| 3,104,477 | A | * | 9/1963 | Edwell | 33/374 |
| 3,724,087 | A | * | 4/1973 | Ostrager | 33/383 |
| 4,130,943 | A | * | 12/1978 | Talbot | 33/374 |
| 4,152,838 | A | * | 5/1979 | Cook | 33/374 |
| 4,928,395 | A | * | 5/1990 | Good | 33/382 |
| 5,249,365 | A | * | 10/1993 | Santiago | 33/374 |
| 5,433,011 | A | * | 7/1995 | Scarborough et al. | 33/374 |
| 6,041,510 | A | * | 3/2000 | Huff | 33/374 |
| 6,047,478 | A | * | 4/2000 | Sowers | 33/374 |
| 6,058,617 | A | * | 5/2000 | Nadu | 33/374 |
| 6,282,805 | B1 | * | 9/2001 | Cosentino | 33/374 |
| 6,293,023 | B1 | * | 9/2001 | Schooley | 33/375 |

* cited by examiner

*Primary Examiner*—G. Bradley Bennett
(74) *Attorney, Agent, or Firm*—Alix, Yale & Ristas, LLP

(57) ABSTRACT

A modular level, which functions as a level for construction trades, comprises a pair of levels which combine to function as one level. The levels also may be separated so that each level may be individually used as a level.

24 Claims, 10 Drawing Sheets

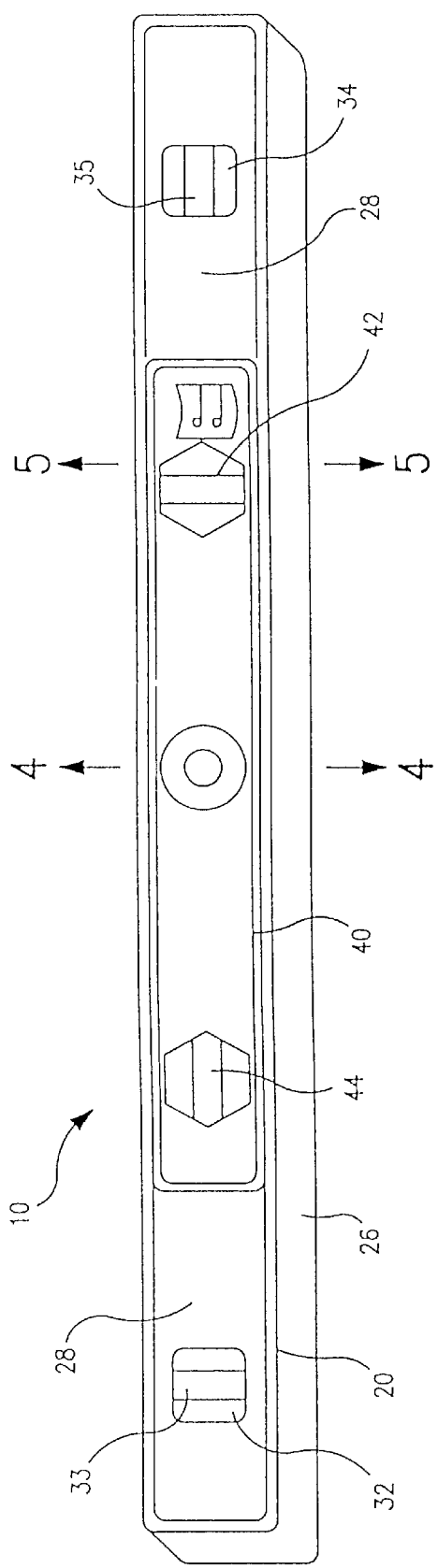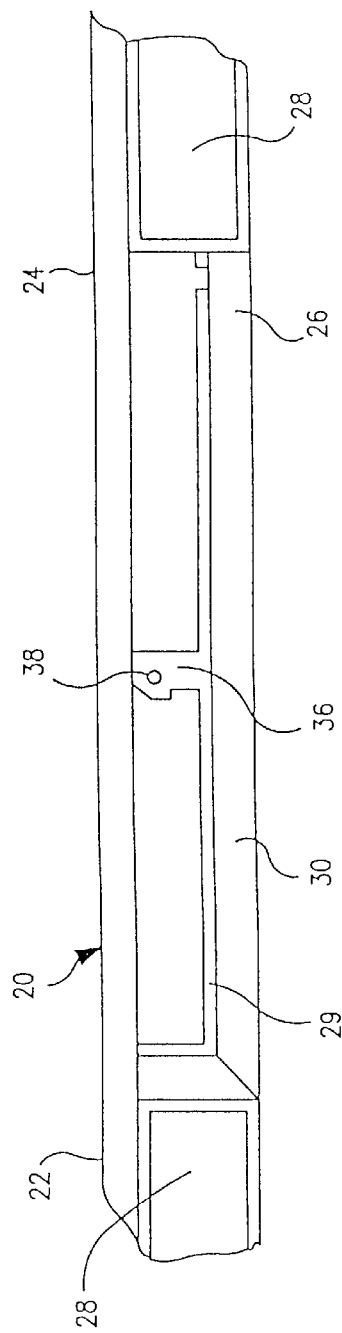

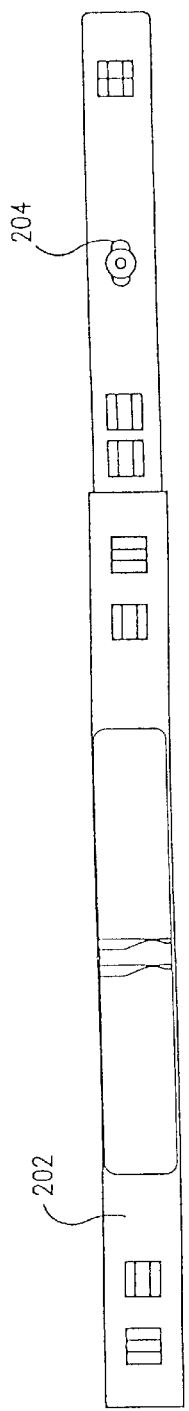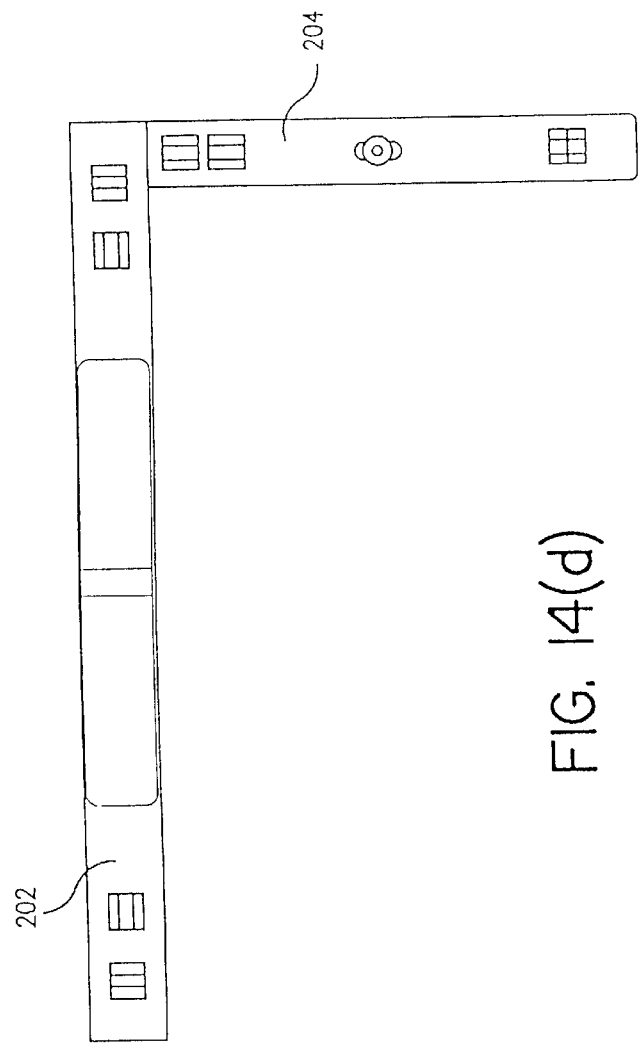
FIG. 14(c)
FIG. 14(d)

MULTI-CONFIGURABLE MODULAR LEVEL

CROSS-REFERENCE TO RELATED APPLICATION

This application is a continuation of U.S. application Ser. No. 09/375,863, filed on Aug. 17, 1999 now U.S. Pat. No. 6,282,805.

FIELD OF THE INVENTION

This invention relates generally to carpenter's or box levels employed in the construction trades for establishing a level (horizontal) reference line, or a plumb (vertical) reference line.

BACKGROUND OF THE INVENTION

In the construction trades the need often arises to establish a reference line which is level or a reference line which is plumb and to this end various devices have been developed for establishing such reference lines. One of the most common devices for establishing a reference line is the carpenter's level.

The carpenter's level has at least one reference edge and one or more bubble vials for correctly aligning the reference edge along a true horizontal or vertical line. Carpenter's levels are commonly available in various lengths ranging from about eight inches up to about forty-eight inches. While levels in the common range of lengths are suitable for most tasks, the need often arises for a level of extended length, such as a level of over forty-eight inches in length. Levels of extended length are not widely available and those which are available tend to be expensive on account of their unusual size. In addition, levels of extended length are unwieldy due to their size and present problems in transport and storage.

It is well-known that even though the carpenter's level is a valuable and oftentimes costly tool, it is subject to the vicissitudes of use. Bumping and jarring in the course of everyday handling can cause the bubble vials of the level to become misaligned with respect of the reference edge, thereby degrading the accuracy of the level and ultimately its usefulness.

In view of the need for a level of extended length and versatility and the drawbacks associated with such levels as are presently known in the art and the for maintaining the accuracy of such a level, the inventor has developed the present invention.

SUMMARY OF THE INVENTION

Briefly stated, the invention in a preferred form is a modular level for use in construction trades. The modular level comprises a master level and an auxiliary level which is releasably retainable to the master level so that the integrated assembly can function as a construction level and the master level and auxiliary level may be separated and individually used as construction levels.

The modular level comprises a master frame having opposed longitudinally spaced end portions and a central receptacle. Level vials are mounted to opposed end locations of the master vial at opposite sides of the central receptacle. The auxiliary level, which may have two level vials and a linear reference edge, is received in the receptacle. A retainer, such as a bolt, extends through the auxiliary level to releasably retain the level to the frame. The frame may comprise a plate having a threaded opening which threadably receives the bolt.

In one embodiment, the master level has a plumb vial and a longitudinally spaced horizontal level vial at opposite positions, and the auxiliary vial also has a plumb vial and a longitudinally spaced horizontal vial. When the auxiliary level is retained to the master level, all of the vials of the master level and the auxiliary level align. In one embodiment of the invention, each of the master and auxiliary levels has a box level configuration.

An object of the invention is to provide a new and improved level having an efficient construction which incorporates two levels into a single integrated unit.

Another object of the invention is to provide a new and improved construction level having a multi-faceted capability and which is efficient to use and store.

A further object of the invention is to provide a new and improved tool which incorporates two levels into a single module for use in both integrated and separated modes.

Other objects and advantages of the invention will become apparent from the drawings and the specification.

BRIEF DESCRIPTION OF THE DRAWINGS

FIG. 1 is a perspective view of a modular level in accordance with the present invention;

FIG. 2 is a fragmentary perspective view of a master level component of the modular level of FIG. 1;

FIG. 14(*b*) is a schematic view illustrating a modular level in a separated configuration;

FIG. 14(*c*) is a schematic view illustrating the modular level assembled in an extended configuration;

FIG. 14(*d*) is a schematic view illustrating the modular level assembled in a square configuration;

DETAILED DESCRIPTION OF THE PREFERRED EMBODIMENTS

Figure 3:
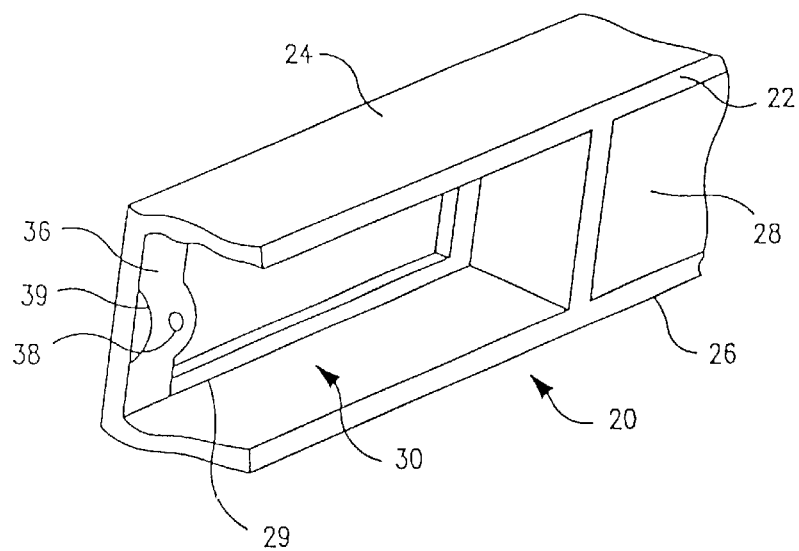
FIG. 3 is an enlarged fragmentary perspective view of a portion of the master level of FIG. 2.

With reference to the drawings, wherein like numerals represent like parts throughout the figures, a modular level in accordance with the present invention is generally designated by the numeral 10. The modular level is a composite construction which comprises a master level 20 and an auxiliary level 40 which are nested in a module so that the modular level 10 can essentially function as a single level or be separated to function as the two separate levels 20, 40. The levels 10, 20 and 40 may have a box-type structure or numerous other configurations.

The master level 20 comprises an elongated frame 22, which may be constructed of metal, plastic or other suitable materials. The master level 20 functions as a standard construction level with the frame 22 providing the principal structure. The frame 22 is symmetric about a longitudinal axis disposed between a pair of parallel linear reference edges 24, 26. The frame, which may have a generally rail-type construction, defines a central channel-like receptacle 30 which receives the auxiliary level 40, which may be, for example, a two foot level. The receptacle 30 may be open at the front and rear portion thereof and forms a retaining shoulder 29 for capturing the auxiliary level 40.

The opposing end portions of the frame include panels 28 which define channels, slots or fixed structures for slidably receiving or mounting opposed level vials or vial/window units 32, 34. Each level vial unit 32, 34 preferably comprises an elongated transparent tube 33, 35 which is filled with a liquid which forms a bubble to indicate a given level or non-level orientation.

The proper angular orientation of the vial/vial units 32, 34 relative to the reference edges 24, 26 is important for functioning of the level. The frame may include or receive panels 28 or other structures which define, for example, a polygonal opening commensurate with a complementary polygonal shape of the fixture for the vial unit. A stud/notch structure or other suitable indexing means (neither illustrated) may also be employed on the frame and vial unit to properly position the vial tube 33, 35.

In one embodiment, one of the vial units 32 is a plumb (vertical or perpendicular to the reference edge) vial, and the other vial unit 34 is a horizontal (parallel to the reference edge) vial. It is generally preferred that both of the vials are equidistantly spaced from the longitudinal center of the level. Additional horizontal or plumb vials may also be provided.

Figure 6:
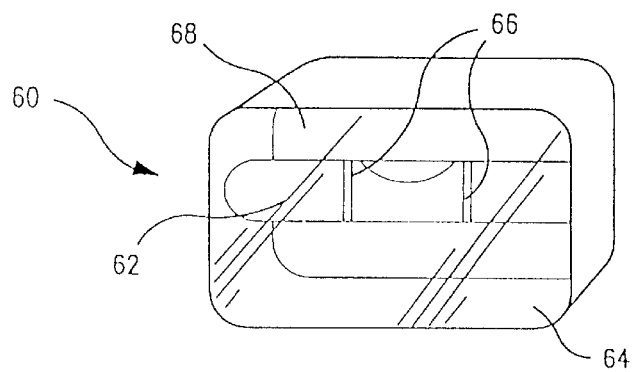
FIG. 6 is a frontal perspective view illustrating a representative level vial unit which may be employed in the modular level.

With reference to FIG. 6, for a representative level vial unit 60, which may be employed in place of level vial unit 32 or 34, the tube 62 is mounted to a fixture 64 which mounts the vial to the frame. The fixture 64 may assume a wide variety of configurations. The tube is etched or inscribed with lines 66 which indicate the "level" position of the bubble. A transparent glass or plastic window 68 may also be mounted to the fixture. In some embodiments, transparent level vials without additional windows are employed. Unless otherwise indicated, level vial units 32, 34 refer to both vial and vial/window units.

Figure 4:
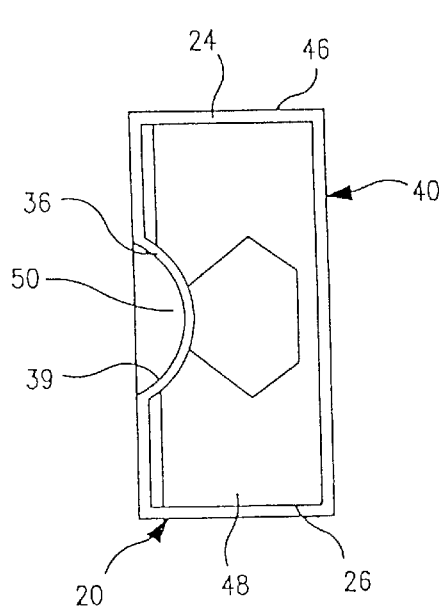
FIG. 4 is an enlarged sectional view of the modular level of FIG. 1, taken along the line 4—4 thereof.
Figure 5:
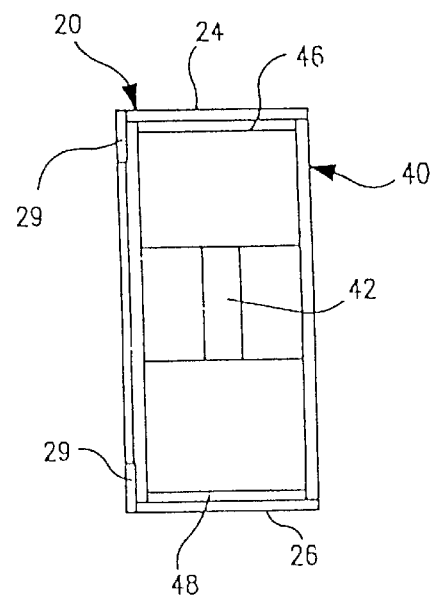
FIG. 5 is an enlarged sectional view of the modular level of FIG. 1, taken along the line 5—5 thereof.

With reference to FIGS. 2–4, the frame comprises a medial plate 36 having a threaded opening 38 which receives a screw bolt 50. The bolt extends through a central opening in the auxiliary level and captures the auxiliary level at a central location thereof. The bolt 50 is preferably retained with the auxiliary level 40. The screw bolt 50 is capable of free rotation and is threadably receivable in the plate for securing the auxiliary level 40 in a captured properly aligned position against shoulder 29. The medial plate 36 may have a convex bow 39 adjacent the threaded opening 38 to accommodate the end of the bolt so that it does not project beyond the rear face of the master level.

Figure 7:
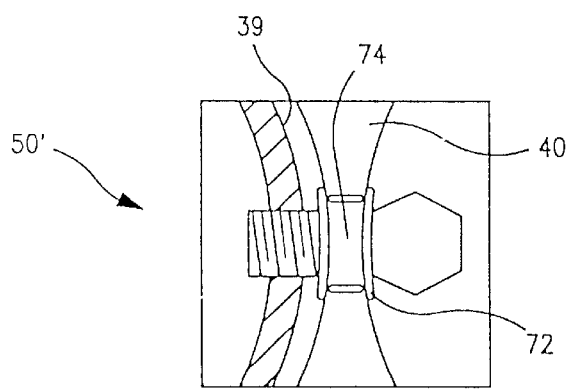
FIG. 7 is an enlarged sectional view illustrating an alternative embodiment of the modular level.
Figure 8:
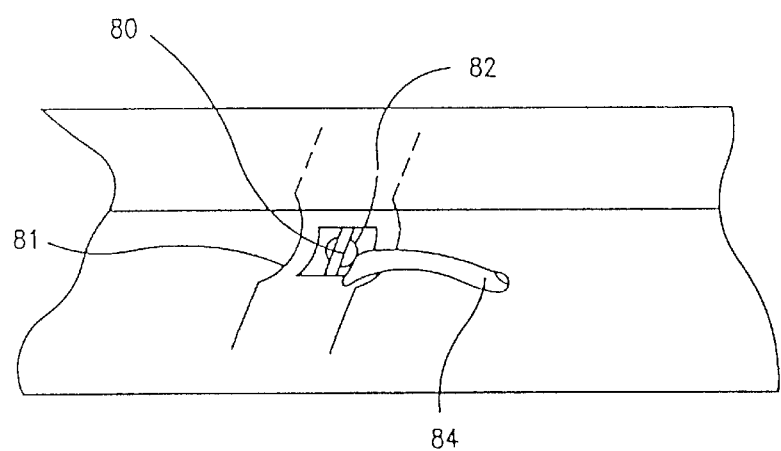
FIG. 8 is a fragmentary perspective view illustrating another embodiment of the modular level.
Figure 9:
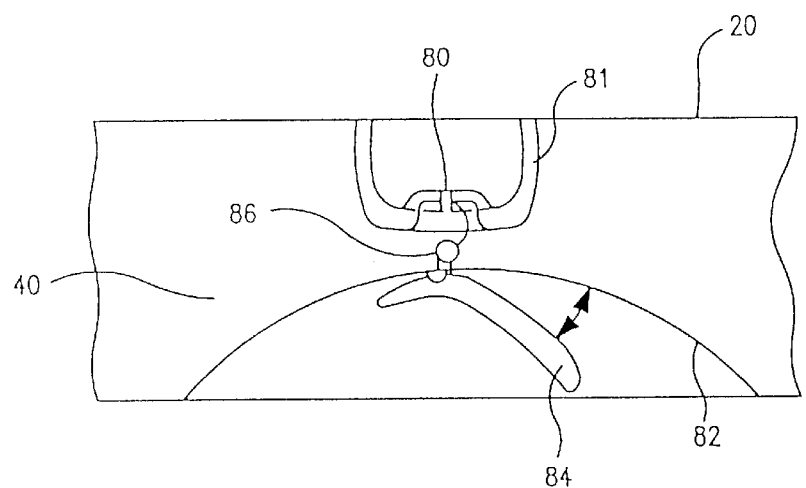
FIG. 9 is a fragmentary sectional view of the level of FIG. 8.

With reference to FIG. 7, the screw bolt 50' may be retained to the auxiliary level by means of a bifurcated collar 72 which retains a washer 74. The washer 74 permits free rotation of the bolt 50' relative to the auxiliary level. Alternatively, as illustrated in FIGS. 8 and 9, the auxiliary level 40 may be retained to the master level 20 by a latch bar 80 fixed to a bracket 81 of the master level. The bar 80 receives a hook-type latch 82 controlled by a pivotal handle 84. The latch 82 pivots about a post 86 (partially illustrated) fixed to the auxiliary level. The direction of handle movement is illustrated by the FIG. 9 arrows. The handle may also be mounted in a recess of the auxiliary level. Naturally, other alternative means for retaining the auxiliary level to the master level may also be employed.

The rear portion of the auxiliary level 40 is preferably configured to be complementary with the frontal surfaces of the retainer structure of the master level 20 as illustrated in FIG. 9. The conforming shapes of the master level 20 and auxiliary level 40 also strengthen the level assembly and ensure linear integrity of the reference edges 24, 26.

In one embodiment, as illustrated, the auxiliary level 40 comprises a plumb vial unit 42 and a horizontal level vial unit 44 at opposing end locations thereof. Additional horizontal or plumb vials may also be provided. Vial units 42, 44 may also be configured similar to vial unit 60. The auxiliary level has a pair of parallel linear reference edges 46, 48. The auxiliary level is configured so that upon reception, the reference edges 46, 48 are parallel to the corresponding reference edges 24, 26 of master level 20. The exterior dimensions are configured for close reception in the channel or receptacle 30 of the frame so that the central screw bolt 50 aligns with the threaded opening 38 of the plate 36 and readily allows for a threaded reception therein as well as subsequent withdrawal.

Alternatively, the auxiliary level may include two horizontal level vials or two plumb level vials or both level and plumb vials at opposite longitudinal positions of the level. It should be appreciated that the vial units 32, 34 and 42, 44 are preferably respectively equidistantly spaced from the center of the frame for both the master level and the auxiliary level.

Figure 10:
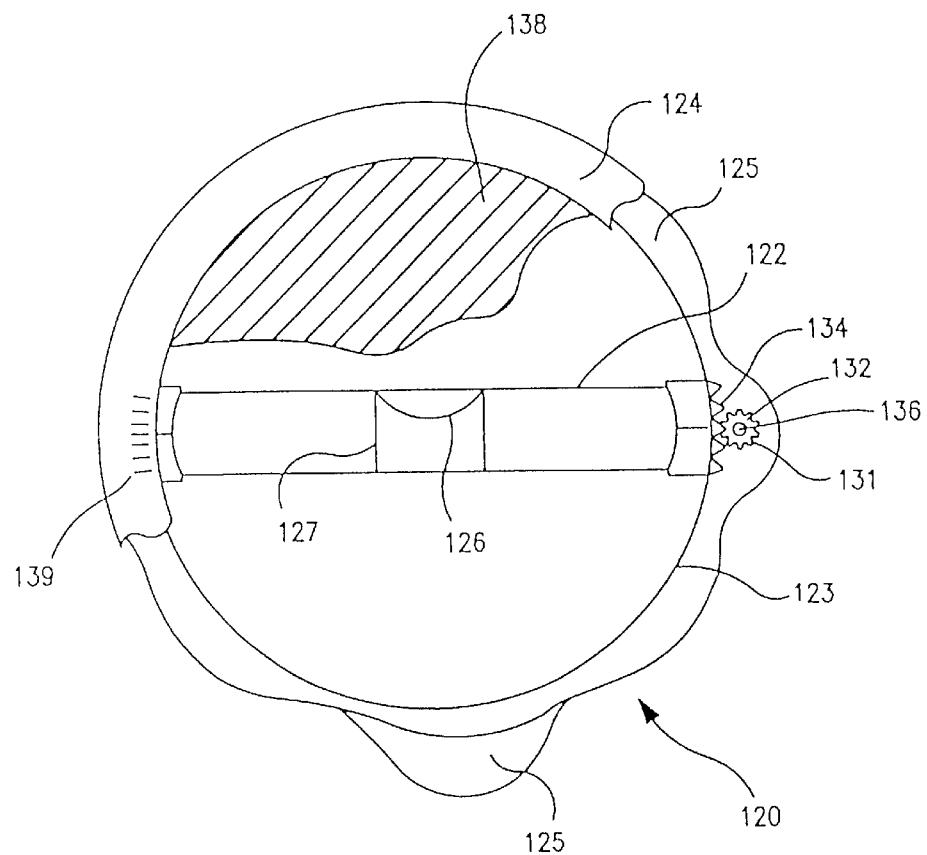
FIG. 10 is a fragmentary side view, partly in section and portions removed, of the adjustable bubble vial of the present invention and portions of the modular level.
Figure 17:
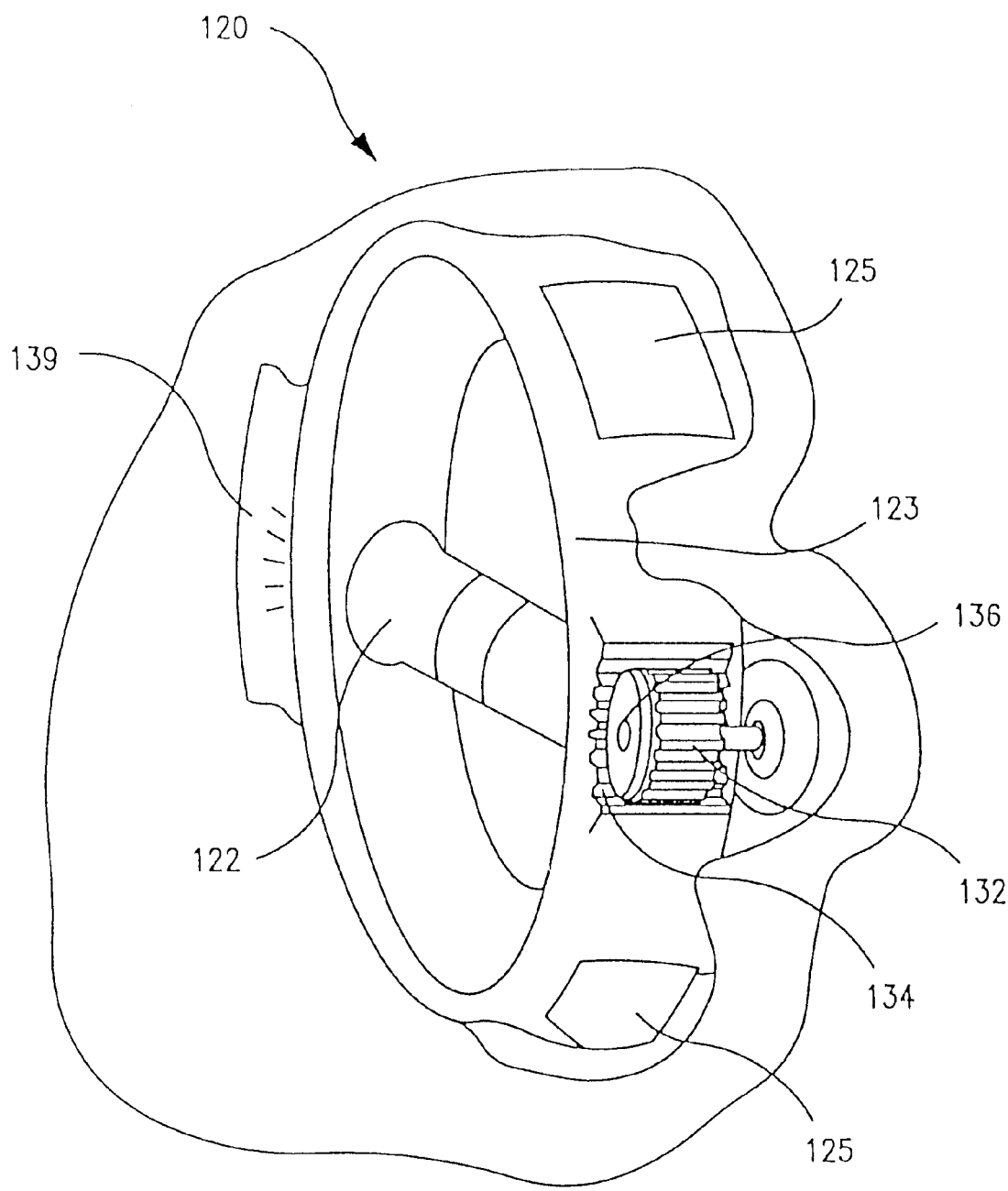
FIG. 17 is a fragmentary perspective view, portions broken away, of the adjustable bubble vial of FIG. 10 and surrounding portions of the modular level.

With reference to FIGS. 10 and 17, a bubble vial which may be employed with the levels of the present invention may assume the form of an adjustable vial unit 120 which has an adjustment mechanism for maintaining the vial 122 in accurate parallel relationship with the linear reference edge of the level. The adjustment mechanism includes a rotatable pinion 132 for angularly adjusting the alignment of the vial for calibration purposes.

The vial unit 120 has a cylindrical wall or inner frame 123 which interiorly supports the vial. The inner frame 123 is closely received in a cylindrical cavity or frame opening of the level. A plurality of angularly spaced tabs 125 protrude radially from the wall. The tabs are captured by an annular cover 124 which forms an arcuate slot. The tabs 125 are closely received in the slots to allow for limited angular rotation of the vial unit. Adjacent one end of the wall, a tooth gear surface 134 having a radius of curvature, which is the center of the vial unit, meshes with the pinion 132. The pinion 132 is mounted to the frame of the level. The pinion is preferably covered by cover 124 except for a small access opening (not illustrated).

It will be appreciated that the level may be calibrated by incrementally rotating the pinion 132 which may be accessed through the access opening through the face of the modular level. The pinion 132 has a central socket or slot 136. The pinion is rotated by torquing an Allen wrench, small screwdriver or other suitable tool which engages slot 136. The opposing end of the level vial cover is affixed with a calibration scale 139 having a plurality of calibration marks which are alignable with a reference mark on the vial unit to aid in the calibration process. The vial unit 120 is mounted in the frame or to the panels of the modular level in such a fashion that ordinarily the position of the level is tightly fixed and can only be angularly repositioned by means of the pinion 132 which requires significant and purposeful torque to implement the adjustment.

In use, the modular level 10 may be employed as a single level so that all of the vials of both of the levels 20, 40 can be employed. Alternatively, the auxiliary level 40 can be removed from the frame by loosening bolt 50, and both the auxiliary level 40 and the master level 20 can be used separately. In one embodiment, the master level 20 is four foot in length and the auxiliary level 40 is two foot in length.

Figure 11:
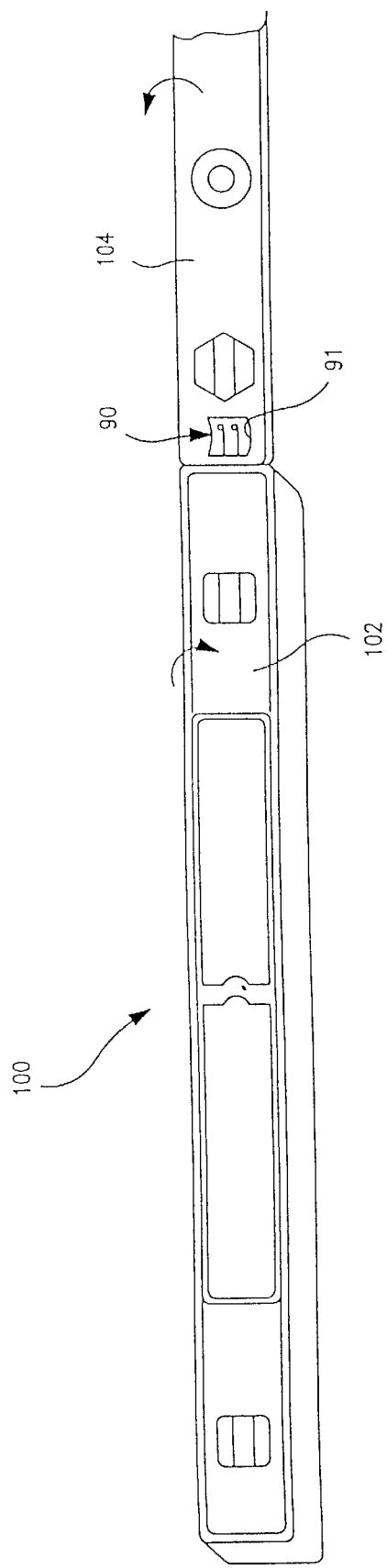
FIG. 11 is a side view, partly in schematic, illustrating the end-to-end coupling of two levels, one partially illustrated, in accordance with the present invention.

With reference to FIG. 11, a modular level in accordance with the present invention is generally designated by the numeral 100. Modular level 100 incorporates a coupling mechanism 90 (see also FIGS. 12 and 13) which permits two levels 102 and 104 to be joined in end-to-end fashion as illustrated. Except for the modifications described below, levels 102 and 104 may be similar in form and function to levels 20 and 40, respectively.

Figure 12:
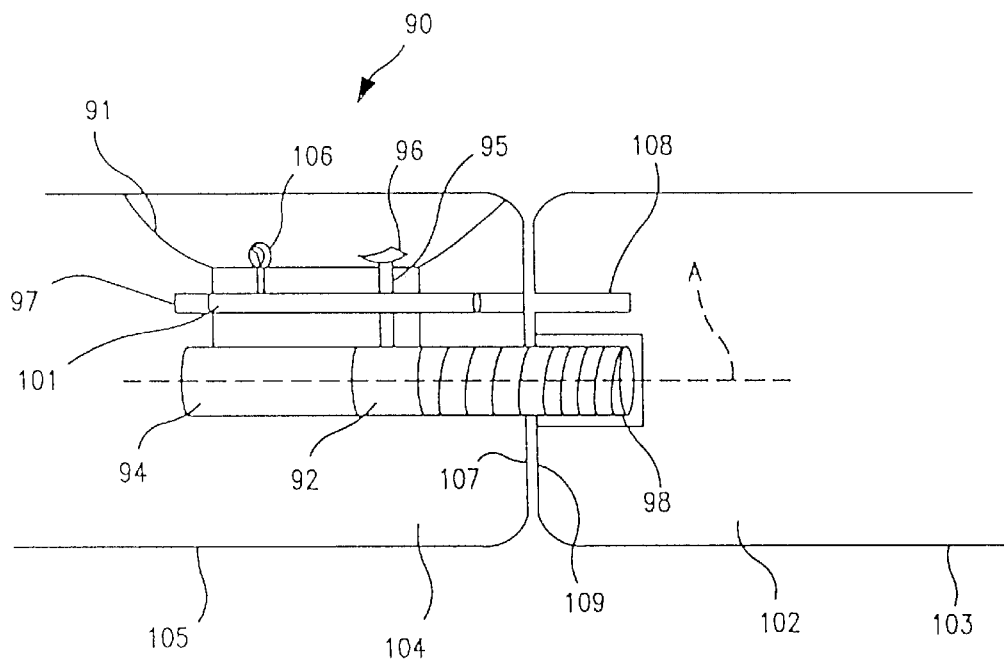
FIG. 12 is an enlarged fragmentary side sectional view of the levels of FIG. 11 illustrating the end-to-end coupling of the two levels.
Figure 13:
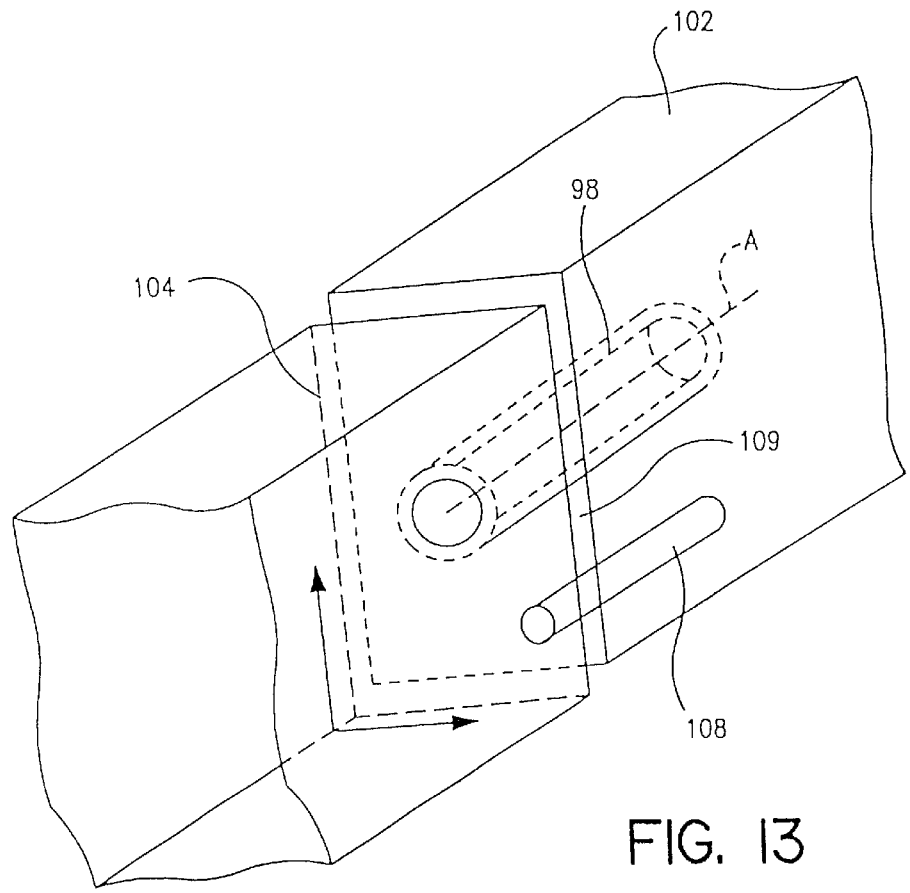
FIG. 13 is a fragmentary perspective view, partly in phantom and partly in schematic, illustrating the coupling portion of the level configuration of FIG. 11.

With reference to FIGS. 12 and 13, the coupling mechanism 90 for releasably joining a master level 102 and an auxiliary level 104 for providing a level of extended length is shown. The coupling mechanism 90 includes, in a longitudinal outer end of the auxiliary level 104, a bolt 92 adapted for threadable engagement with a threaded receiver 98 fixed in a longitudinal end of the master level 102. The bolt 92 is adapted for selectable retractable longitudinal movement thereby permitting the bolt to be retracted within the end of the level 104 or extended from the bolt from the end of the level 104, as desired. A bolt cavity 94 is provided in the level to accommodate the bolt 92 when in the retracted position and to provide a precise guide for the bolt 92 when it is extended. The bolt cavity 94 generally extends along the longitudinal axis of the level and opens through the exterior of the bolt-end of the level.

The relationship between the bolt 92 and the receiver 98 is critical. The central axis A through the bolt and the central longitudinal axis through the receiver are coaxial upon coupling so that reference edges 103 and 105 of the master and auxiliary levels precisely align. In this regard, the end surfaces 107, 109 of the auxiliary and master levels abut in a substantially surface-to-surface or adjacent parallel relationship so that a reference edge continuum defined by reference edges 103 and 105 is provided along one side of the coupled master level and the auxiliary level. It will, of course, be appreciated that the dimensions of the master and auxiliary levels are such that the auxiliary level does not form a coplanar relationship at all faces with the master level when they are disposed in end-to-end relationship. The bolt cavity has sufficient length to permit the bolt 92 to be fully retracted with the bolt cavity 94.

Associated with the retractable bolt in a recess 91 of a face or panel of level 102 is a laterally extending position selector 95 for manual selected movement of the bolt 92 from, for example, a retracted to an extended position. A button 96 associated with the position selector 95 provides a convenient and comfortable surface for finger or thumb engagement to facilitate selectively moving the position selector. A first guide slot 97 is formed in the level accommodating sliding horizontal movement of the position selector 95 and associated bolt 92. The second level features a bolt receiver 98 for retaining the bolt 92 and is adapted for threadable engagement of the bolt 92.

Alternatively, the bolt 92 may be retained in either the lock or retained position by a spring loaded detent arrangement (not illustrated) or by other wellknown mechanisms.

The two levels 102 and 104 are connected in end-to-end relationship by projecting the bolt 92 and aligning the bolt with the receiver 98 to threadably engage the bolt with the receiver by torquing either the master level and/or the auxiliary level as illustrated by the arrows in FIG. 11. After the end surfaces have been brought into substantially end-to-end relationship and the reference edges 103 and 105 have been properly aligned, a lock pin 101 is slid by means of a button 106 into a corresponding slot 108 at the end of the master level. This facilitates not only the locking of the two levels but implementing the precise alignment required to obtain the precise composite colinear reference edges when the levels are coupled. The lock pin 101 is laterally offset from the bolt 92, and the button 106 is also located in recess 91.

Figure 14A:
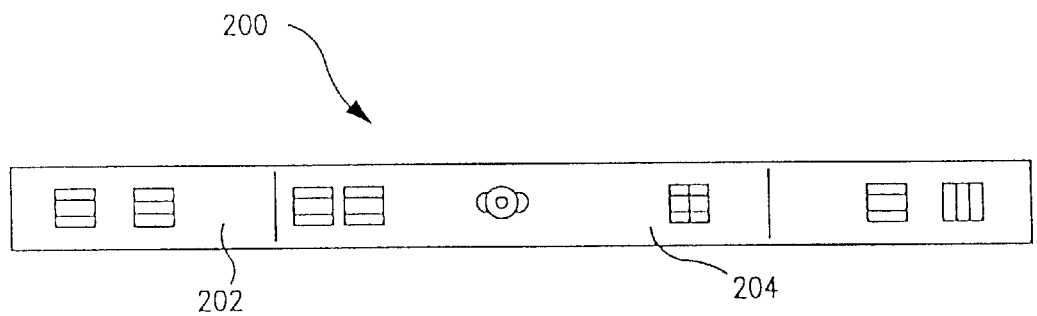
FIG. 14(*a*) is a schematic view illustrating a modular level configuration in a combined configuration.
Figure 14B:
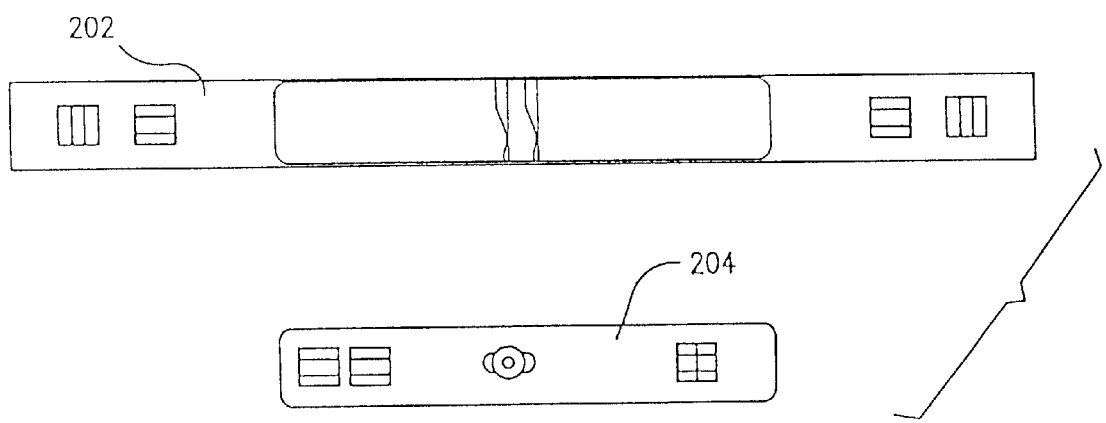

With reference to FIGS. 14(*a*)–(*d*), the inventions may also be implemented in connection with reversing the coupling relationship between the master level 202 and auxiliary level 204 and providing a receiver and a lock slot at both the end of the master level as well as the reference edge thereof. (The corresponding receivers are designated by 98' and 98" and the corresponding lock slots are designated by 108' and 108".) In this fashion, a multi-configurable capability is provided for the modular level unit 200. For example, FIG. 14(*a*) schematically represents the configuration for modular level assembly 200 wherein the auxiliary level 204 is received within the master level 202 to form a single level. FIG. 14(*b*) represents the separated configuration for levels 202 and 204. FIG. 14(*c*) schematically represents a single extended level when the levels 202 and 204 are coupled in end-to-end relationship, and FIG. 14(*d*) shows that the master level 202 and auxiliary level 204 can be coupled together to form a square.

Figure 15:
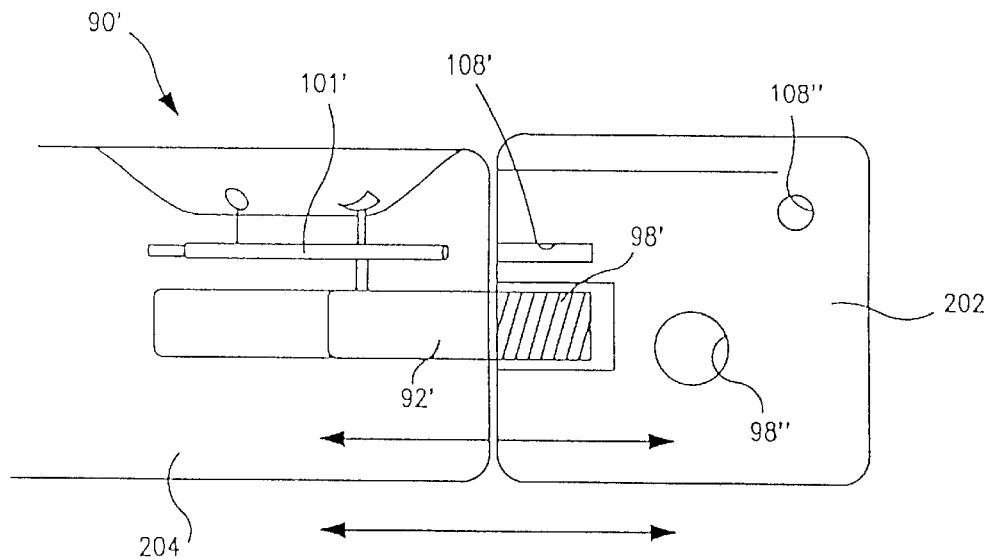
FIG. 15 is a fragmentary end view, partly broken away and partly in schematic, illustrating the square configuration of FIG. 14(*d*)
Figure 16:
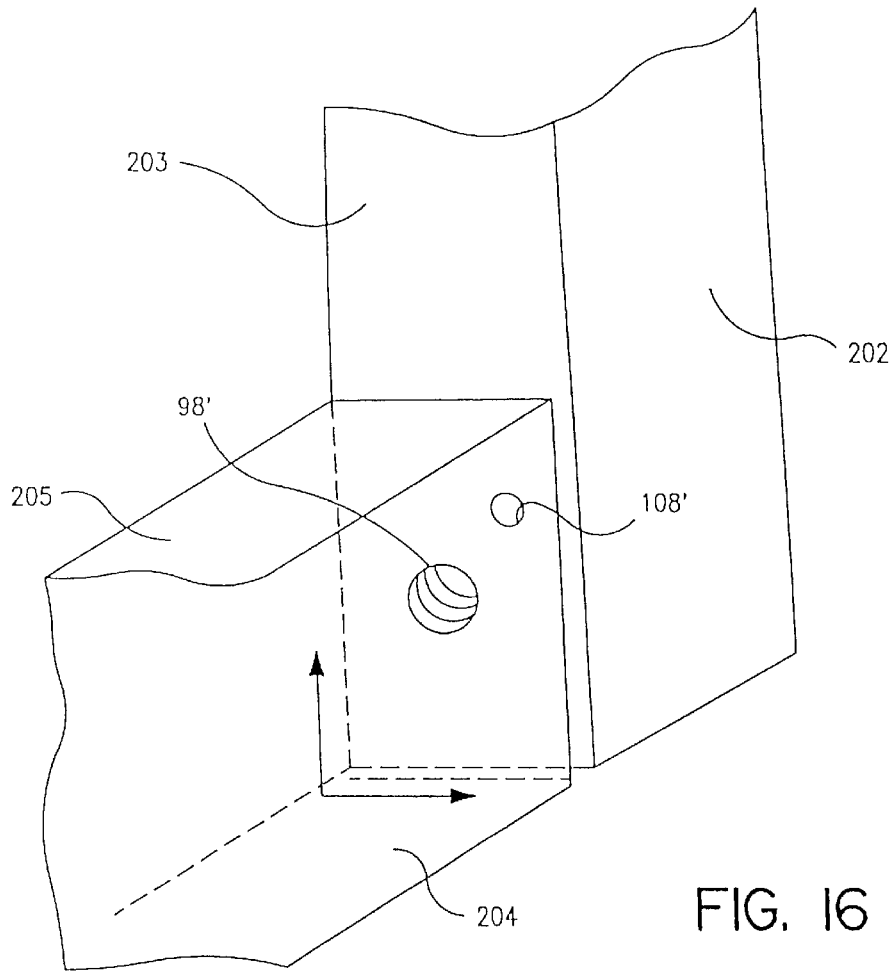
FIG. 16 is a fragmentary perspective view of the square configuration of FIG. 14(d) illustrating the connecting relationship.

With reference to FIGS. 15 and 16, the coupling assembly 90' which is similar in form and function to coupling assembly 90 is incorporated into the modular level unit 200. The master level 202 is illustrated wherein it has receivers 98' and 98" with axes which are essentially orthogonal. In addition, the lock slots 108' and 108" are formed in orthogonal faces of the master level. In this fashion, the coupling connection is made both in an end-to-end relationship as well as an orthogonal relationship which provides for the carpenter's square configuration wherein reference edges 203 and 205 are perpendicular. The receiver/lock bolt relationship between the master level and auxiliary level may be reversed for either the end-to-end or orthogonal coupling.

It will be appreciated that a single level can be equipped at one end with the bolt and the other end and adjacent panel with a bolt receiver. When a length extended level or a carpenter's square is required, a second similarly equipped level can be coupled with the first level by simply coupling the levels together at the appropriate ends. This is accomplished by threading the bolt a first level to the bolt receiver of a second level and rotating one or the other level to obtain secure threaded coupling of the levels. It will further be appreciated that the first and second levels that are coupled together in this manner can be substantially identical levels, levels of different lengths, master levels, auxiliary levels or combinations thereof. The levels may employ various level indicators, such as liquid bubble vials of various forms, electronic indicators or other indicating devices.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A modular level for use in construction trades and the like comprising:
    a master frame defining a longitudinal axis and having opposed longitudinally spaced ends and a linear reference edge extending between said ends and defining a central receptacle having two longitudinally spaced sides and two laterally spaced sides and a transverse opening with a central axis orthogonal to said longitudinal axis;
    at least one level vial positioned at a longitudinal location spaced from said receptacle;
    an auxiliary level receivable in said receptacle through said opening and comprising a linear reference edge generally parallel to said master frame linear edge and at least one level vial, wherein said auxiliary level is laterally and longitudinally enclosed by said receptacle sides; and
    retainer means for releasably retaining said auxiliary level to said frame.

2. The modular level of claim 1 wherein said retainer means further comprises a threaded fastener.

3. The modular level of claim 2 wherein said frame further comprises a plate having a threaded opening and said fastener is receivable in said opening.

4. The modular level of claim 3 wherein said auxiliary level defines a transverse opening and said fastener extends through said transverse opening to retain said auxiliary level to said frame.

5. The modular level of claim 1 wherein said auxiliary level reference edge has a length which is substantially one half that of the length of the master frame reference edge.

6. The modular level of claim 1 further comprising a plumb level vial positioned at one location of said frame and a horizontal level vial positioned at an opposite longitudinal location of said frame.

7. The modular level of claim 1 wherein said auxiliary level further comprises a plumb vial and a horizontal vial positioned equidistantly from the longitudinal center of said auxiliary level.

8. A modular level for use in construction trades and the like comprising:
    a master level defining a longitudinal axis and comprising an elongated frame having opposed ends and a linear reference edge extending between said ends and defining a central receptacle having a transverse opening with a central axis orthogonal to said longitudinal axis, said master level comprising a pair of longitudinally spaced level vials mounted to said frame, said receptacle being disposed between said vials and having a pair of longitudinally spaced sides;
    an auxiliary level receivable in said receptacle through said opening and comprising a pair of longitudinally spaced level vials and a linear reference edge parallel to said master level reference edge, said vial cooperatively coupled to an adjustment means for accurately changing a positional relationship of the vial with respect to the master frame linear edge, said auxiliary level enclosed by said longitudinally spaced sides; and
    a fastener assembly releasably retaining said auxiliary level to said master level.

9. The modular level of claim 8 wherein said frame further comprises a laterally extending plate having a central recessed portion defining a threaded opening and said fastener assembly comprises a fastener engageable in said opening.

10. The modular level of claim 9, wherein said auxiliary level has an opening and said fastener extends through said opening.

11. The modular level of claim 8 wherein said auxiliary level has a longitudinal length which is substantially one half that of the length of the master level.

12. The modular level of claim 8 wherein one of said master vials comprises a plumb level vial and the other of said master vials comprises a horizontal level vial.

13. The modular level of claim 12 wherein said auxiliary level vials include a plumb vial and a horizontal vial positioned equidistantly from the center of said auxiliary level.

14. The modular level of claim 8 wherein said master level vials and said auxiliary level vials generally align along a longitudinal axis of said frame.

15. The modular level of claim 8, wherein the vial adjustment means comprises:
    a vial unit having a support frame with an engageable surface,
    an adjustment surface which engages the support frame engageable surface adjustably connected to a pinion gear relatively mounted in the master level frame, said pinion gear having an opening for receiving a tool.

16. The modular level of claim 15, wherein the support frame engageable surface is a cylindrical wall which is dimensioned to fit into a cavity of the master level, said cylindrical wall having a plurality of angularly spaced tabs protruding radially from said cylindrical wall.

17. The modular level of claim 15, wherein the support frame has an engageable surface adjacent to an end of the vial, and has a calibration surface on a opposite end of the vial, said calibration surface has a plurality of calibration marks which are alignable with a reference mark on the master level.

18. The modular level of claim 16, wherein the pinion gear having teeth which mesh with the protrusions on the support frame engageable surface.

19. A modular level for use in construction trades and the like comprising:
    a master level defining a longitudinal axis and having opposed ends and a pair of laterally spaced linear reference edges extending between the ends and a pair of equidistantly spaced level vials equidistantly longitudinally spaced from said ends, said master level comprising a frame portion having a substantially rectangular shape with a generally rectangular transverse opening disposed between said edges and defined by four sides and having a central axis orthogonal to said longitudinal axis;

an auxiliary level closely transversely receivable in said frame portion, said auxiliary level comprising a pair of laterally spaced reference edges and a pair of opposed ends where said auxiliary level reference edges and ends are enclosed by said sides and a pair of level vials equidistantly spaced from said ends and generally alignable with said master frame level vials; and retainer means for releasably retaining said auxiliary level to said frame portion.

20. The modular level of claim 19 wherein said frame portion further comprises a plate which extends between said reference edges, said plate defining a threaded opening, and wherein said retainer means further comprises a fastener which extends through said auxiliary level and engages in said opening.

21. The modular level of claim 19 wherein said auxiliary level has a longitudinal length which is substantially one half that of the length of the master level.

22. The modular level of claim 19 wherein said master level vials include a plumb vial and a horizontal vial.

23. The modular level of claim 19 further comprising a window for each of said vials, each said vial being disposed between a pair of windows to provide generally transverse visual inspection of said vials.

24. The modular level of claim 23 wherein said windows have a polygonal shape.

* * * * *